No. 807,862. PATENTED DEC. 19, 1905.
F. P. PFLEGER.
INDICATOR.
APPLICATION FILED JULY 12, 1905.
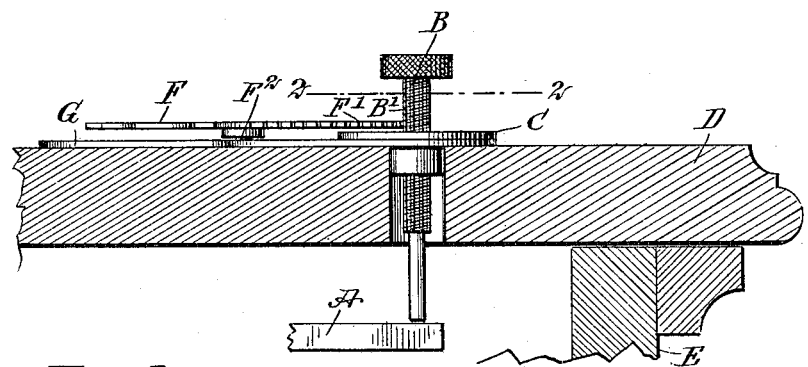
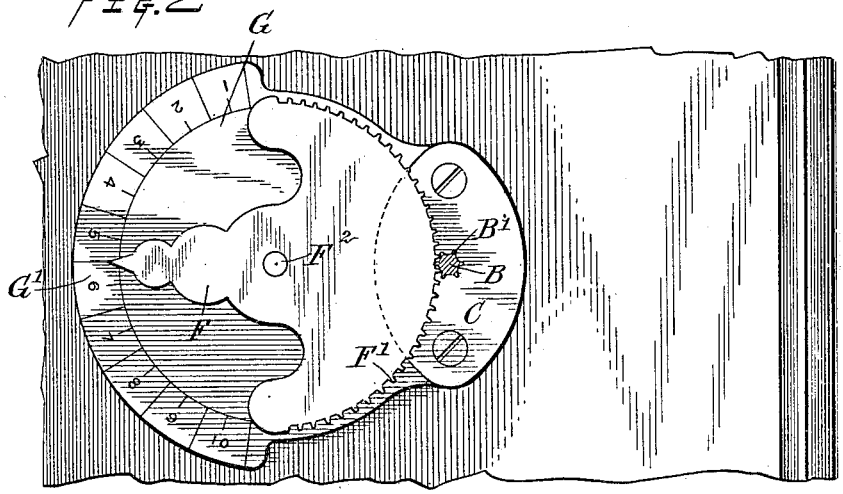
WITNESSES:
INVENTOR
Frank P. Pfleger
BY
ATTORNEYS

UNITED STATES PATENT OFFICE.

FRANK PAUL PFLEGER, OF EL PASO, TEXAS.

INDICATOR.

No. 807,862.  Specification of Letters Patent.  Patented Dec. 19, 1905.

Application filed July 12, 1905. Serial No. 269,294.

*To all whom it may concern:*

Be it known that I, FRANK PAUL PFLEGER, a citizen of the United States, and a resident of El Paso, in the county of El Paso and State of Texas, have invented a new and Improved Indicator, of which the following is a full, clear, and exact description.

The object of the invention is to provide a new and improved indicator more especially designed for use on phonographs, music-boxes, and like instruments and arranged to permit the user of the instrument to quickly adjust the speed-regulating device of the instrument according to the proper time in which a certain piece of music is to be performed.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in both views.

Figure 1 is a sectional side elevation of a phonograph provided with the improvement, and Fig. 2 is a sectional plan view of the same on the line 2 2 of Fig. 1.

The governor-bar A of a speed-regulating device of a phonograph, music-box, or like instrument is engaged by the usual regulating-screw B, screwing in a nut C, fixed to the cover D of the casing E of the instrument. When the operator turns the regulating-screw B, the governor-bar A is swung up or down, according to the direction in which the regulating-screw B is turned, and consequently the speed of the instrument is changed.

The regulating-screw B, as illustrated in Figs. 1 and 2, is provided, besides its usual screw-threads, with gear-teeth B' in mesh with a segmental gear-wheel F', forming part of a pointer F, mounted to turn at F² and indicating on a graduation G' on a dial G, secured to the cover D and preferably forming part of the nut C, as indicated in the drawings. Now it is evident that when the regulating-screw B is turned its gear-teeth B' cause the segmental gear-wheel F' to turn to move the pointer F along the graduation G', which latter is preferably provided with graduation-marks numbered consecutively, as plainly shown in Fig. 2.

The time in which the piece of music is to be played is indicated on the record, and this time is preferably marked by a numeral corresponding to one of the numerals of the graduations G'. When the operator places the record in the machine, it is only necessary for him to turn the regulating-screw B until the pointer F indicates on the same numeral of the graduation G' which is marked on the record.

It is evident that the records may be marked and the graduation G' may be correspondingly arranged on the instrument by the manufacturers; but, if desired, the user of the instrument may mark the records according to the time and as indicated by the graduation G'. It is also evident that the graduation G' and the marks made on the records may be other than numerals as long as they correspond to cause the instrument to turn the record at the speed required for playing the piece of music according to the time in which it is written.

Having thus described my invention, I claim as new and desire to secure by Letters Patent—

1. An indicator comprising a screw-rod having gear-teeth formed directly on the threaded portion thereof, a pointer mounted to swing and having segmental gear in mesh with the said screw-rod gear-teeth, and a dial on which indicates the pointer.

2. In an indicator of the character described, a screw-rod for operating the speed-regulating device of a phonograph or like instrument, said screw-rod having gear-teeth formed directly on the threaded portion thereof, a nut in which the screw-rod works, a dial formed integrally with the nut, and a pointer mounted on the dial and having a segmental gear meshing with the teeth of the screw-rod.

In testimony whereof I have signed my name to this specification in the presence of two subscribing witnesses.

FRANK PAUL PFLEGER.

Witnesses:
 GEORGE PENCE,
 H. J. DARWOOD.